US012330421B2

(12) United States Patent
Kato et al.

(10) Patent No.: US 12,330,421 B2
(45) Date of Patent: Jun. 17, 2025

(54) LIQUID DROPLET EJECTING APPARATUS

(71) Applicant: BROTHER KOGYO KABUSHIKI KAISHA, Nagoya (JP)

(72) Inventors: Yuya Kato, Nagoya (JP); Haruhisa Takayama, Nagoya (JP); Atsushi Ito, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 163 days.

(21) Appl. No.: 18/183,249

(22) Filed: Mar. 14, 2023

(65) Prior Publication Data

US 2023/0311517 A1 Oct. 5, 2023

(30) Foreign Application Priority Data

Apr. 1, 2022 (JP) ................................ 2022-061644

(51) Int. Cl.

*B41J 2/165* (2006.01)
*B41J 2/045* (2006.01)
*B41J 2/125* (2006.01)

(52) U.S. Cl.

CPC ......... *B41J 2/16579* (2013.01); *B41J 2/0456* (2013.01); *B41J 2/04561* (2013.01); *B41J 2/04591* (2013.01); *B41J 2/125* (2013.01)

(58) Field of Classification Search

CPC .. B41J 2/0456; B41J 2/04561; B41J 2/04591; B41J 2/04581; B41J 2/16579; B41J 2/16508; B41J 2/16526; B41J 2/16532; B41J 2/0451; B41J 2/2114; B41J 2/2117; B41J 2/125; B41J 2/2139; B41J 2/2142; B41J 2/04503; B41J 2/04505; B41J 2/04508; B41J 2/04526
See application file for complete search history.

(56) References Cited

U.S. PATENT DOCUMENTS

2014/0240390 A1 8/2014 Takada

FOREIGN PATENT DOCUMENTS

JP 2001-293849 A 10/2001
JP 2014-193602 A 10/2014

*Primary Examiner* — Kristal Feggins
(74) *Attorney, Agent, or Firm* — Merchant & Gould P.C.

(57) ABSTRACT

A liquid droplet ejecting apparatus, includes: an ejecting head which ejects liquid droplets; a light source which causes light to be radiated toward a flight space of the liquid droplets with a first output power or a second output power; a detecting element which detects received amount of the light radiated from the light source and passed through the liquid droplets flying in the flight space; and a controller. The controller causes the light to be radiated from the light source with the first or second output power at a timing of the ejecting head being driven to eject the liquid droplets; in a first detecting mode, executes a detection about an ejection failure of the nozzles based on the received amount of the light; and in a second detecting mode, executes a detection about a phenomenon causing the ejection failure based on the received amount of the light.

16 Claims, 14 Drawing Sheets

LIQUID DROPLET EJECTING APPARATUS

REFERENCE TO RELATED APPLICATIONS

This application claims priority from Japanese Patent Application No. 2022-061644 filed on Apr. 1, 2022. The entire content of the priority application is incorporated herein by reference.

BACKGROUND ART

Conventionally, there is a technology for detecting ejection failure of ink droplets ejected from an ejecting head. For example, the following technique is known. Namely, light emitted from a light emitting unit and passed through inside an ink droplet is received by a light receiving unit, and the ejection failure is detected based on presence or absence of decrease in light receiving amount by the light receiving unit. In this technique, the light emitting unit is a semiconductor laser that emits a laser beam, and the maximum output of the semiconductor laser is, for example, 7 mW.

DESCRIPTION

However, if the light is always emitted at high output, the light emitting unit deteriorates early.

Therefore, an object of the present disclosure is to provide a liquid droplet ejecting apparatus capable of suppressing deterioration of a light source as compared with the conventional technique.

According to an aspect of the present disclosure, there is provided a liquid droplet ejecting apparatus including: an ejecting head having a plurality of nozzles through which liquid droplets are ejected onto a print medium; a light source configured to cause light to be radiated toward a flight space with a first output power or a second output power higher than the first output power, the flight space being a space in which the liquid droplets ejected from the ejecting head fly; a detecting element configured to detect received amount of the light radiated from the light source and passed through the liquid droplets flying in the flight space; and a controller configured to: cause the light to be radiated from the light source with the first output power or the second output power at a timing of the ejecting head being driven such that the ejecting head ejects the liquid droplets; in a first detecting mode in which the light is radiated from the light source with the first output power, execute a detection about an ejection failure of one of the nozzles based on the received amount of the light detected by the detecting element; and in a second detecting mode in which the light is radiated from the light source with the second output power, execute a detection about a phenomenon causing the ejection failure based on the received amount of the light detected by the detecting element.

According to the present disclosure, the first detection mode in which the liquid droplet is irradiated with the light at the first output power, and the second detection mode in which the liquid droplet is irradiated with the light at the second output power higher than the first output power, can be used separately. Therefore, it is possible to avoid such a situation in which the light is radiated with a high output power such as the second output power even when detecting the ejection failure of the nozzles. As a result, deterioration of the light source can be suppressed more than in the conventional technique.

According to the present disclosure, it is possible to provide a liquid droplet ejecting apparatus capable of suppressing deterioration of a light source as compared with the conventional technique.

In the following, a liquid droplet ejecting apparatus according to an embodiment of the present disclosure will be explained, with reference to the drawings. The liquid droplet ejecting apparatus to be explained below is merely an embodiment of the present disclosure. Accordingly, the present disclosure is not limited to or restricted by the following embodiment, and any addition, deletion and/or change is/are possible within a range not departing from the spirit of the present disclosure.

Figure 1:
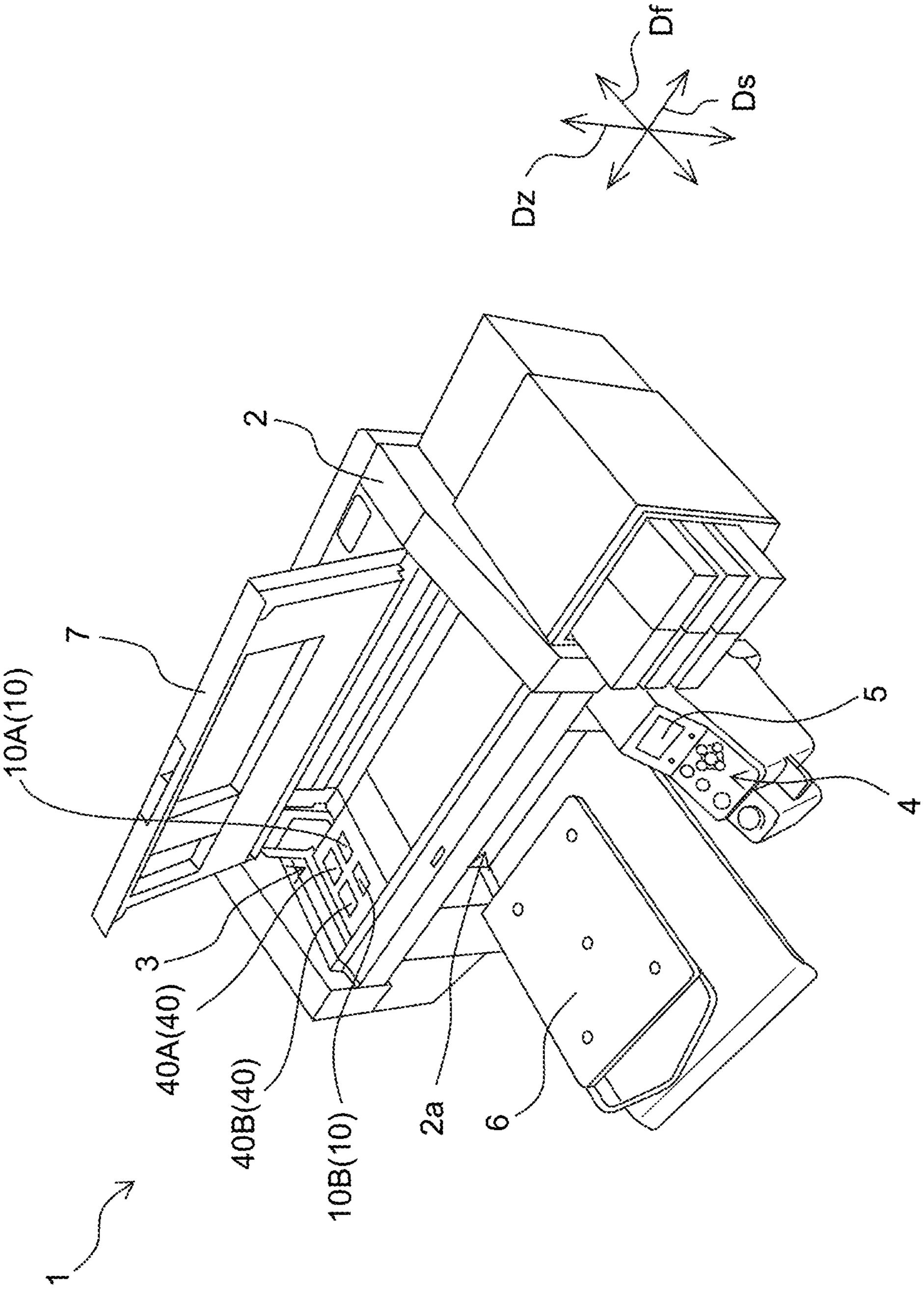
FIG. 1 is a perspective view depicting an image forming apparatus on which a liquid droplet ejecting apparatus according to an embodiment of the present disclosure is provided.

FIG. 1 is a perspective view depicting an image forming apparatus 1 on which a liquid droplet ejecting apparatus 1*a* according to the embodiment of the present disclosure is provided. In the following, although an ink-jet printer capable of performing also a printing with respect to a print medium W, which is a three-dimensional object, is disclosed, as an example of the image forming apparatus 1, the image forming apparatus 1 also includes an ink-jet printer capable of performing the printing only on a sheet (paper sheet, paper), etc. In FIG. 1, directions which are orthogonal to one another defined as a first direction Ds, a second direction Df and a third direction Dz. In the present embodiment, for example, the first direction Ds is a moving direction of a carriage 3 (to be described later on), the second direction Df is a conveying direction of a print medium W (to be described later on) and the third direction Dz is an up-down direction. In the following explanation, the first direction Ds is referred to as the moving direction Ds, the second direction Df is referred to as the conveying direction Df and the third direction Dz is referred to as the up-down direction Dz.

Figure 4:
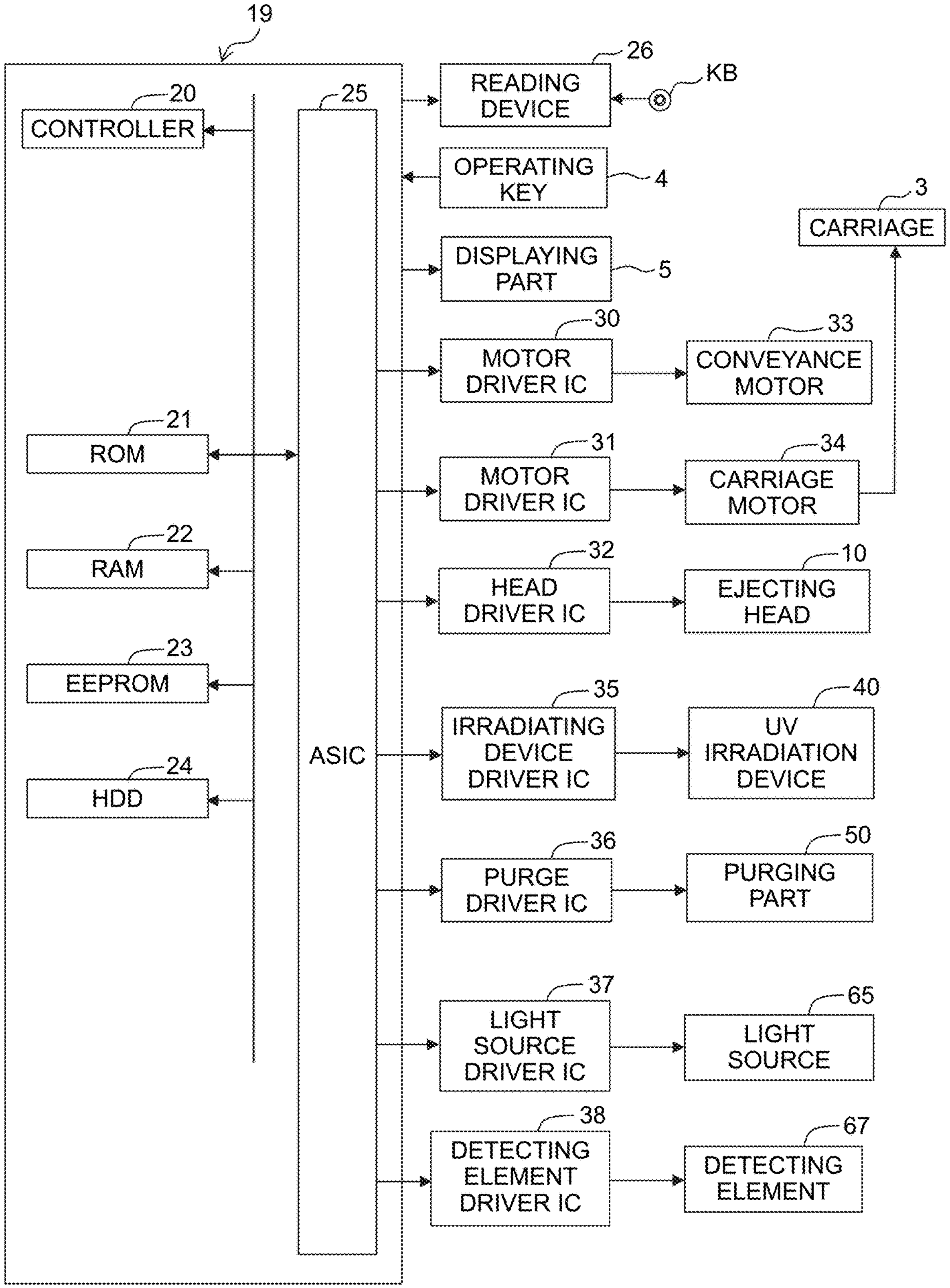
FIG. 4 is a block diagram depicting constitutional elements of the image forming apparatus of FIG. 1.

As depicted in FIG. 1, the image forming apparatus 1 of the present embodiment is provided with a casing 2, an operating key 4, a displaying part 5, a platen 6 on which the print medium W is arranged, and an upper cover 7. Further, the image forming apparatus 1 is provided with the liquid droplet ejecting apparatus 1*a* of FIG. 2. The liquid droplet ejecting apparatus 1*a* has: an ejecting head 10; and a controller unit 19 which includes a controller 20 (FIG. 4). The ejecting head 10 is an ink-jet head which ejects, for example, a ultraviolet-curable ink droplet Id (FIG. 5) as a liquid droplet.

The casing 2 is formed to have a shape of a box. The casing 2 has an opening part 2*a*. The operating key 4 is provided on the casing 2. Further, the displaying part 5 is provided in the vicinity of the operating key 4. The operating key 4 receives an operational input by a user. The displaying part 5 is constructed, for example, of a touch panel, and displays specified information. A part of the displaying part 5 functions also as the operating key. The controller unit 19 realizes a printing function based on an input from the operating key 4 or an external input via a non-illustrated communication interface. Further, the controller unit 19 controls display of the displaying part 5.

The platen 6 is configured to place the print medium W thereon. The platen 6 has a predetermined thickness, and is constructed, for example, of a rectangular plate member of which longitudinal direction is the conveying direction Df. The platen 6 is detachably supported by a non-illustrated platen supporting stand. The platen supporting stand is configured to be movable in the conveying direction Df, by driving of a conveying motor 33 (FIG. 4), between a print position at which the printing with respect to the print medium W is executed and an attaching-detaching position at which the print medium W is attached to or detached from the platen 6. With this, the platen 6 relatively moves an ejection-objective surface of the print medium W relative to the ejecting head 10 in the conveying direction Df. Since the platen 6 moves in the conveying direction Df during the printing, the print medium W placed on the platen 6 is conveyed along the conveying direction Df.

The upper cover 7 is configured such that in a case that an end part of the upper cover 7 is lifted upward, the upper cover 7 is rotated upward. With this, the inside of the casing 2 is exposed.

Figure 2:
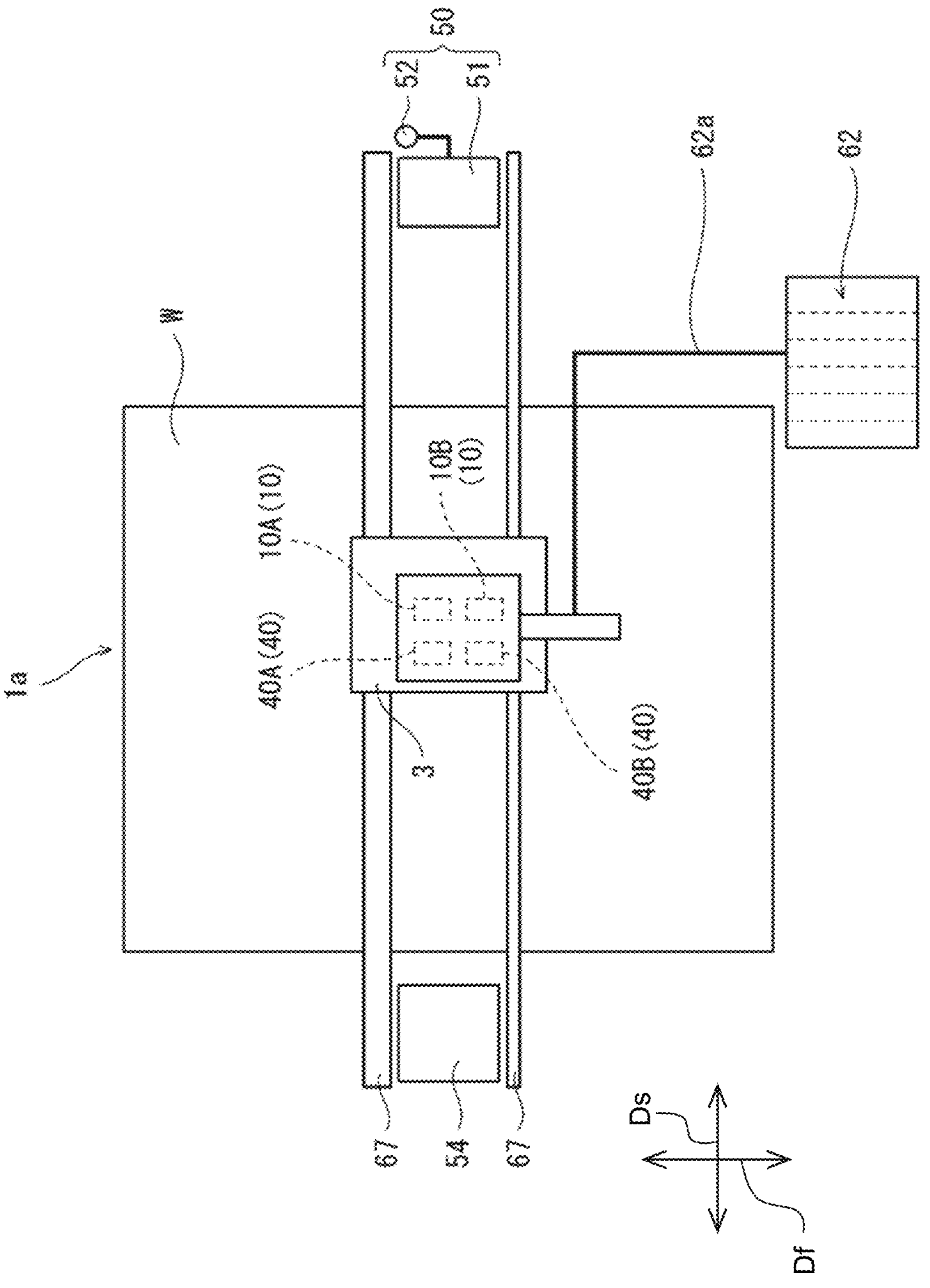
FIG. 2 is a plan view depicting the liquid droplet ejecting apparatus according to the embodiment of the present disclosure.

As depicted in FIG. 2, the liquid droplet ejecting apparatus 1*a* is provided with: a storing tank 62, the carriage 3, and a pair of guide rails 67. The carriage 3 has, for example, two ejecting heads 10 (10A, 10B) and two ultraviolet ray irradiating devices 40 (40A, 40B) mounted thereon. Note that although the two ejecting heads 10 and the two ultraviolet ray irradiating devices 40 are provided on the liquid droplet ejecting apparatus 1*a*, the configuration of the liquid droplet ejecting apparatus 1*a* is not limited to this; it is also allowable to provide one ejecting head 10 and one ultraviolet irradiating device 40 on the liquid droplet ejecting apparatus 1*a*.

The carriage 3 is supported by the pair guide rails 67 extending in the moving direction Ds, and moves reciprocally in the moving direction Ds along the pair of guide rails 67. With this, the two ejecting heads 10 (10A, 10B) and the two ultraviolet ray irradiating devices 40 (40A, 40B) move reciprocally in the moving direction Ds. Further, the ejecting heads 10 are connected to the storing tank 62 via a tube 62*a*.

In the present embodiment, the ejecting head 10A ejects, for example, ink droplets Id of respective colors which are yellow (Y), magenta (M), cyan (C) and black (K) which are collectively referred to as a color ink, in some cases. The ink droplets Id of the above-described four colors are ejected on the print medium W to thereby print a color image on the print medium W. On the other hand, the ejecting head 10B ejects ink droplets Id of white (W) and ink droplets Id of a clear (Cr). In a case of printing a color image, for example, on a fabric (textile) as the print medium W, the ink droplets Id of the white ink is previously ejected on the print medium W so as to lower any influence to the color of the fabric and/or the material of the fabric, and the ink droplets Id of the color inks are ejected on the ink droplets Id of the white ink. Further, the ink droplets Id of the clear ink are ejected in a case of imparting glossiness and/or in a case of protecting a print part (on which the printing is performed).

The inks are stored in the storing tank 62. The storing tank 62 is provided for each of kinds of the ink. The storing tank 62 is provided, for example, as six storing tanks 62, and store, respectively, the black, yellow, cyan, magenta, white and clear inks.

The liquid ejecting apparatus 1*a* is further provided with a purging part 50 and a receiving part 54. The receiving part 54 is arranged at an end part on one side in the moving direction Ds of the pair of guide rails 67 so that the receiving part 54 overlaps with a moving area of the carriage 3. The purging part 50 is arranged at an end part on the other side in the moving direction Ds of the pair of guide rails 67 so that the purging part 50 overlaps with the moving area of the carriage 3.

The purging part 50 has a cap 51, a suction pump 52 and a non-illustrated lifting-lowering mechanism. The lifting-lowering mechanism lifts and lowers the cap 51 between a suction position and a standby position. The suction pump 52 is connected to the cap 51. At the standby position, an ejection surface NM (FIG. 3) is away from the cap 51. On the other hand, at the suction position, the ejection surface NM is covered by the cap 51 and an enclosed space is defined. In a case that the cap 51 is at the suction position and that the suction pump 52 is driven, the pressure of the enclosed space becomes to be a negative pressure to thereby discharge (exhaust) the ink from a nozzle holes 121*a* (FIG. 3) (a purging processing).

The receiving part 54 receives the ink droplet Id discharged from the ejecting head 10 by a flushing processing.

Figure 3:
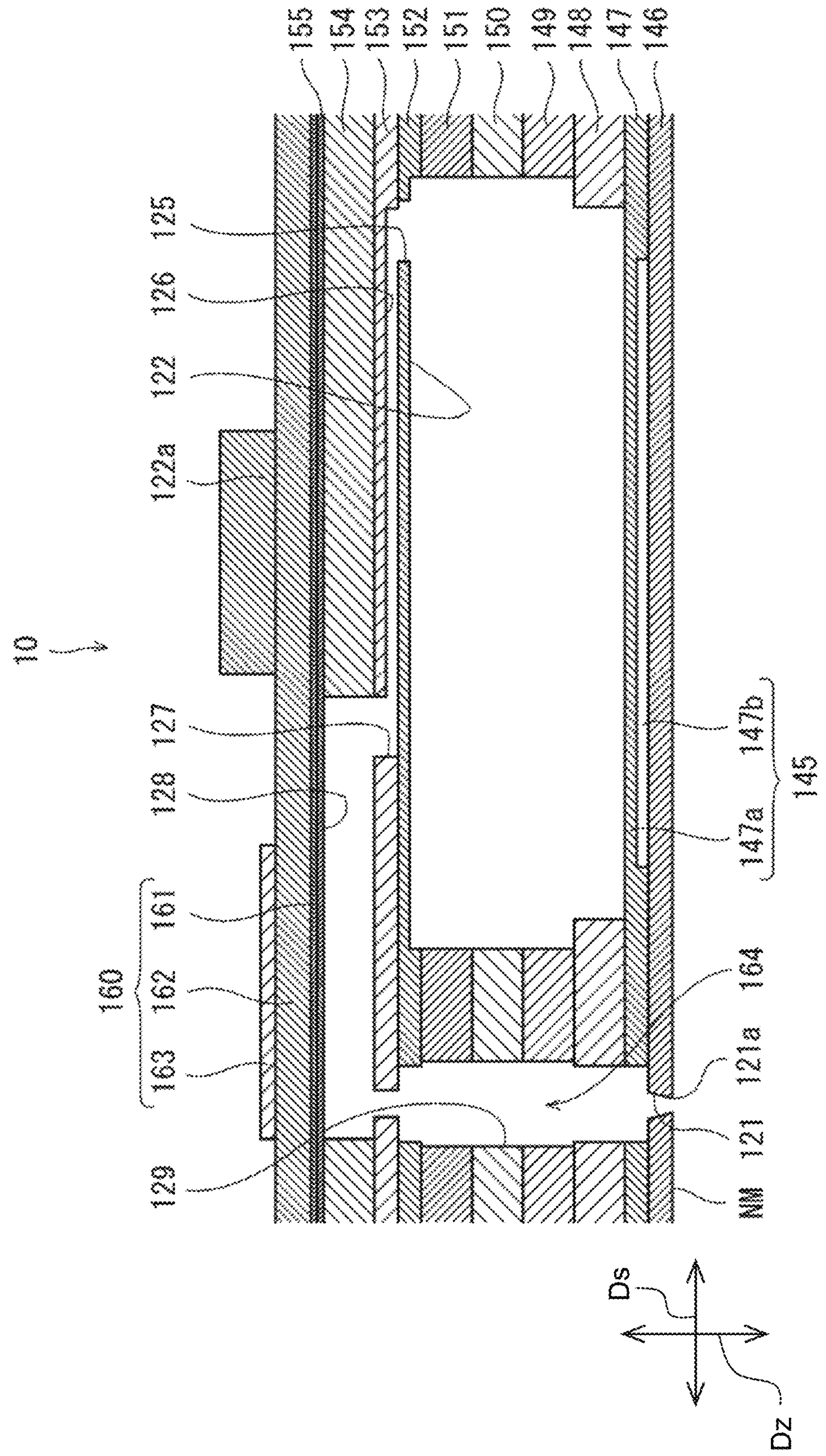
FIG. 3 is a cross-sectional view depicting the configuration of an ejecting head of FIG. 1.

Next, the detailed configuration of the ejecting head 10 will be explained. As depicted in FIG. 3, the ejecting head 10 has a plurality of nozzles 121. The ink supplied from the storing tank 62 to the ejecting head 10 is discharged from the plurality of nozzles 121 as the ink droplets Id. The ejecting head 10 has a stacked body of a channel forming body and a volume changing part. An ink channel is formed in the inside of the channel forming body. A plurality of nozzle holes 121*a* is opened in the ejection surface Nm which is a lower surface of the channel forming body. Further, the volume changing part changes the volume of the ink channel. In this situation, in each of the plurality of nozzles holes 121*a*, the meniscus is vibrated so as to eject the ink from each of the plurality of nozzles holes 121*a*.

The channel forming body of the ejecting head 10 is a stacked body of a plurality of plates. The volume changing part includes a vibration plate 155 and an actuator (piezoelectric element) 160. A common electrode 161 (to be described later on) is formed on the vibration plate 155.

The channel forming body is formed by stacking, from the lower side in the following order: a nozzle plate 146, a spacer plate 147, a first channel plate 148, a second channel plate 149, a third channel plate 150, a fourth channel plate 151, a fifth channel plate 152, a sixth channel plate 153 and a seventh channel plate 154.

Holes and grooves of which size are various are formed in the respective plates. In the inside of the channel forming body in which the respective plates are stacked, the holes and grooves are combined to thereby form the plurality of nozzles 121, a plurality of individual channels 164 and a manifold 122, as the ink channel.

Each of the plurality of nozzles 121 is formed to penetrate through the nozzle plate 146 in a stacking direction. The plurality of nozzles holes 121*a* is arranged side by side in the ejection surface NM of the nozzle plate 146 in the conveying direction Df so as to form a nozzle row.

The manifold 122 extends in the conveying direction Df, and is connected to an end of each of the plurality of individual channels 164. Namely, the manifold 122 functions as a common channel of the ink. A through hole which penetrates through the first channel plates 148 to the fourth channel plate 151 in the stacking direction and a recessed part which is recessed from a lower surface of the fifth channel plate 152 are overlapped or stacked in the stacking direction to thereby form the manifold 122.

The nozzle plate 146 is arranged at a location below the spacer plate 147. The spacer plate 147 is formed, for example, of a stainless steel material. In the spacer plate 147, a recessed part 145 recessed from a surface, of the spacer plate 147 on a side of the nozzle plate 146, in a thickness direction of the spacer plate 147 is formed by, for example, the half etching. The recessed part 145 has a thinned part constructing a damper part 147*a* and a damper space 147*b*. With this, the damper space 147*b* as a damper space is defined between the manifold 122 and the nozzle plate 146.

A supply port 122*a* is communicated with the manifold 122. The supply port 122*a* is formed, for example, in a cylindrical shape, and is provided on an end in the conveying direction Df of the manifold 122. Note that the manifold 122 and the supply port 122*a* are connected to each other by a non-illustrated channel.

Each of the plurality of individual channels 164 is connected to the manifold 122. Each of the individual channels 164 has an upstream end connected to the manifold 122 and a downstream end connected to a base end of one of the plurality of nozzles 121. Each of the individual channels 164 is constructed of a first communicating hole 125, a supply throttle channel 126 as an individual throttle channel, a second communicating hole 127, a pressure chamber 128, and a descender 129; and these constitutive elements are connected in this order.

A lower end of the first communicating hole 125 is connected to an upper end of the manifold 122. The first communicating hole 125 extends from the manifold 122 upward in the stacking direction, and penetrates a upper part in the fifth channel plate 152 in the stacking direction.

An upstream end of the supply throttle channel 126 is connected to an upper end of the first communicating hole 125. The supply throttle channel 126 is formed, for example, by the half etching, and is constructed of a groove recessed from a lower surface of the sixth channel plate 153. Further, an upstream end of the second communicating hole 127 is connected to a downstream end of the supply throttle 126. The second communicating hole 127 extends from the supply throttle channel 126 upward in the stacking direction, and is formed to penetrate the sixth channel plate 153 in the stacking direction.

An upstream end of the pressure chamber 128 is connected to a downstream end of the second communicating channel 127. The pressure chamber 128 is formed to penetrate the seventh channel plate 154 in the stacking direction.

The descender 129 is formed to penetrate, in the stacking direction, the spacer plate 147, the first channel plate 148, the second channel plate 149, the third channel plate 150, the fourth channel plate 151, the fifth channel plate 152 and the sixth channel plate 153. An upstream end of the descender 129 is connected to a downstream end of the pressure chamber 128 and a downstream end of the descender 129 is connected to the base end of each of the nozzles 121. For example, each of the nozzles 121 overlaps with the descender 129 in the stacking direction, and is arranged at the center in the descender 129 in a width direction.

The vibration plate 155 is stacked on the seventh channel plate 154 and covers an upper end opening of the pressure chamber 128.

The actuator 160 includes the common electrode 161, a piezoelectric layer 162 and an individual electrode 163 which are arranged from the lower side in this order. The common electrode 161 covers the entire surface of the vibration plate 155. The piezoelectric layer 162 covers the entire surface of the common electrode 161. The individual channel 163 is provided on the pressure chamber 128, and is arranged on the piezoelectric layer 162. One piece of the actuator 160 is constructed of one piece of the individual electrode 163, the common electrode 161 and a part (active part), of the piezoelectric layer 162, which are sandwiched by one piece of the individual electrode 163 and the common electrode 161.

The individual electrode 163 is electrically connected to a driver IC. The driver IC receives a control signal from the controller 20, generates a driving signal (voltage signal) and applies the driving signal to the individual electrode 163. In contrast, the common electrode 161 is always maintained at a ground potential. In such a configuration, the active part of the piezoelectric layer 162 expands and contracts in accordance with the driving signal, together with the common electrode 161 and the individual electrode 163, in a plane direction. In response to this, the vibration plate 155 deforms in a direction increasing or decreasing the volume of the pressure chamber 128. With this, an ejecting pressure of ejecting the ink droplet Id from each of the nozzles 121 is imparted to the ink inside the pressure chamber 128.

In the ejecting head 10, the ink flows into the manifold 122 via the supply port 122*a*, and then flows into the supply throttle channel 126 from the manifold 122 via the first communicating hole 125. Further, the ink flows into the pressure chamber 128 from the supply throttle channel 126 via the second communicating hole 127. Afterwards, the ink flows in the descender 129 and flows into each of the nozzles 121. In this situation, in a case that the ejecting pressure is applied from the actuator 160 to the pressure chamber 128, the ink droplet Id is ejected from one of the nozzle holes 121*a*.

As depicted in FIG. 4, the image forming apparatus 1 is further provided with a controller unit 19, a reading device 26, a motor driver ICs 30, 31, a head driver IC 32, a conveying motor 33, a carriage motor 34, an irradiating device driver IC 35, a purge driver IC 36, a light source driver IC 37 and a detecting element driver IC 38. The liquid droplet ejecting apparatus 1*a* is further provided with a light source 65 and a detecting element 67.

The controller unit 19 has the controller 20 constructed of a CPU, memories (storing parts: a ROM 21, a RAM 22, an EEPROM 23 (EEPROM is a registered trademark of Renesas Electronics Corporation) and a HDD 24) and an ASIC 25. The controller 20 is connected to each of the above-described storing parts, and controls the driver ICs 30 to 32, 35 to 38 and the displaying part 5.

The controller 20 executes a predetermined processing program stored in the ROM 21 to thereby executes a variety of kinds of functions. The controller 20 may be implemented on the controller unit 19 as one processor, or may be implemented on the controller unit 19 as a plurality of processors which cooperate each other. The processing program is read by the reading device 26 from a recording medium KB such as a computer-readable magneto-optical disc, etc., or a USB flash memory. etc., and is stored in the ROM 21. The RAM 22 stores image data received from outside and an arithmetic result of the controller 20, etc. The EEPROM 23 stores a variety of kinds of initial setting information inputted by the user. The HDD 24 stores specific information, etc.

The motor driver ICs 30 and 31, the head driver IC 32, the irradiating device driver IC 35, the purge driver IC 36, the light source 37, the detecting element driver IC 38 are connected to the ASIC 25. If the controller 20 accepts a print job from the user, the controller 20 outputs an image recording instruction to the ASIC 25 based on the processing program. The ASIC 25 drives the respective driver ICs 30 to 32 and 35 to 38 based on the image recording instruction. The controller 20 drives the conveying motor 33 by the motor driver IC 30 to thereby move the platen 6 in the conveying direction Df. The controller 20 drives the carriage motor 34 by the motor driver IC 31 to thereby move the carriage 3 in the moving direction Ds.

The controller 20 converts the image data obtained from an external apparatus, etc., into ejection data for ejecting the ink droplet Id onto the ejection surface of the print medium W. The controller 20 causes the ejecting head 10 to eject the ink droplet Id by the head driver IC 32 based on the converted ejection data. Further, the controller 20 causes light-emitting diode chips of the ultraviolet ray irradiating device 40 to radiate an ultraviolet ray by the irradiating device driver IC 35. The controller 20 drives the purging part 50 by the purge driver IC 36. The controller 20 drives the light source 65 by the light source driver IC 37, and drives the detecting element 67 by the detecting element driver IC 38.

Figure 5:
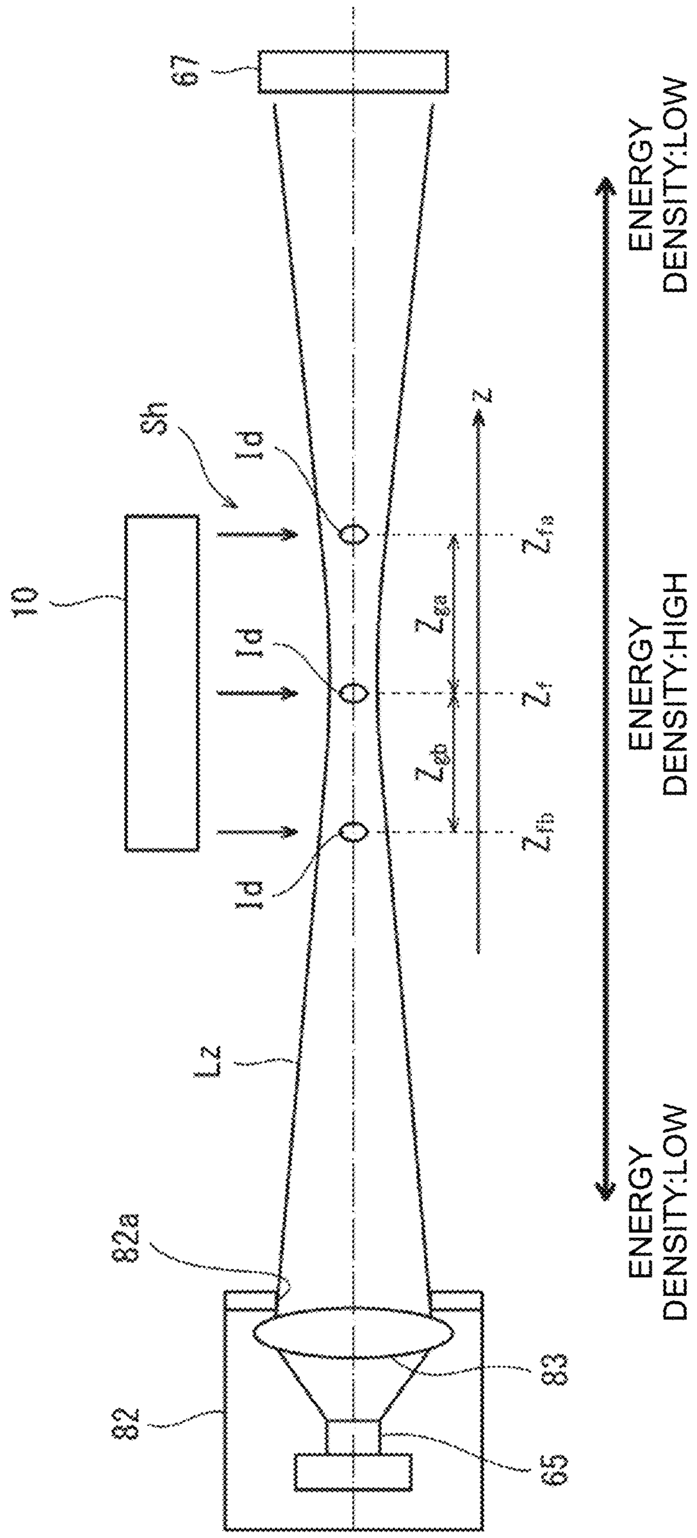
FIG. 5 depicts a state where ink droplets, which have been ejected from the ejecting head and are flying in a flight space, are irradiated with a laser light.

FIG. 5 depicts a state where ink droplets Id which have been ejected from the ejecting head 10 and are flying in a flight space Sh are irradiated with a laser light Lz.

As depicted in FIG. 5, the light source 65 is positioned on one side with respect to the position of the ejecting head 10 in an optical axis direction of the laser light Lz radiated from the light source 65. The light source 65 causes the laser light Lz to be radiated toward the flight space Sh where the ink droplets Id ejected from the nozzles 121 of the ejecting head 10 fly.

The light source 65 causes the laser light Lz to be radiated with a first output power, a second output power higher than the first output power, or a third output power higher than the second output power.

The light source 65 is arranged in a box-shaped light source accommodating part 82. The light source accommodating part 82 has a slit 82*a* on a side of an emission of the laser light Lz with respect to the light source 65. A lens 83 is arranged in the light source accommodating part 82 to cover the slit 82*a* from an inside of the light source accommodating part 82. In this configuration, the laser light Lz radiated from the light source 65 passes through the lens 83, and then the ink droplets Id, that have been ejected from the ejecting head 10 and are flying in the flight space Sh, are irradiated with the laser light Lz.

The detecting element 67 is arranged on the other side with respect to the position of ejecting head 10 in the optical axis direction of laser light Lz. The detecting element 67 is arranged such that the flight space Sh is sandwiched between the light source 65 and the detecting element 67. The detecting element 67 detects a received amount of the laser light radiated from the light source 65 and passed through the ink droplets Id flying in the flight space Sh.

The liquid droplet ejecting apparatus 1*a* has three detecting modes (first through third detecting modes) for detecting ejection failure and the like. The user can select one of the first, second, and third detecting modes using operation keys 4, etc. The user can select the first detecting mode, for example, when a standard quality printing (corresponding to a first image quality) is desired, and can select the second detecting mode when a high quality printing is desired. The user can also select the third detecting mode to determine a correction value for ejection failures detected in the second detecting mode.

In the first detecting mode, the light source 65 irradiates the ink droplets Id with the laser light Lz at a first output power. In the second detecting mode, the light source 65 irradiates the ink droplets Id with the laser light Lz at a second output power. In the third detecting mode, the light source 65 irradiates the ink droplets Id with the laser light Lz at a third output power. The second output power in the second detecting mode is, for example, not less than twice the first output power in the first detecting mode. The third output power in the third detecting mode is, for example, not less than three times the first output power in the first detecting mode. Details of a detection process in each of the first to third detecting modes are described below.

After the user selects one of the first, second, and third detecting modes, and before printing, the controller 20 executes the detection process according to the detecting mode selected by the user. In this case, the controller 20 causes the laser light Lz to be radiated from the light source 65 with the first output power, the second output power, or the third output power, at a timing of the ejecting head 10 being driven such that the ejecting head 10 ejects the liquid droplets Id.

The user can select the first detecting mode, for example, during maintenance before the printing. In the first detecting mode in which the laser light Lz is radiated from the light source 65 with the first output power, the controller 20 detects presence or absence of the ejection failure (non-ejection or large misdirection) of the nozzles 121 based on the received amount of the laser light Lz detected by the detecting element 67. In the first detecting mode, the presence or absence of the ejection failure is determined only by presence or absence of a peak in a detection signal detected by the detecting element 67. The misdirection is described below.

For example, the user can select the second detecting mode when switching from the standard quality printing to the high quality printing. In the second detecting mode in which the laser light Lz is radiated from the light source 65 with the second output power, the controller 20 detects a phenomenon causing the ejection failure based on the received amount of the laser light Lz detected by the detecting element 67. The phenomenon causing the ejection failure is described below. By making the output power of the light source 65 in the second detecting mode to be not less than twice the output power in the first detecting mode, a signal strength and a signal width of the detection signal detected by the detecting element 67 can be made greater. If the controller 20 detects the ejection failure of a certain nozzle 121 in the first detection mode, the controller 20 further executes detection in the second detection mode for the certain nozzle 121 in order to estimate the phenomenon causing the ejection failure.

For example, the user can select the third detecting mode when the phenomenon causing the ejection failure is detected in the second detecting mode. In the third detecting mode in which the laser light Lz is radiated from the light source 65 with the third output power, the controller 20 detects magnitude of the phenomenon causing the ejection failure detected in the second detecting mode. By making the output power of the light source 65 in the third detecting mode to be not less than three times the output power in the first detecting mode, the signal strength and the signal width of the detection signal detected by the detecting element 67 can be made much greater. This makes it easier to detect the magnitude of the phenomenon causing the ejection failure. Based on the magnitude of the phenomenon detected in the third detecting mode, the controller determines a correction value related to an ejection of the ink droplets Id from the certain nozzle 121 with the ejection failure. In this case, the controller 20 determines, for example, a correction value to change a size of each ink droplet Id ejected from the certain nozzle 121, or a correction value to change an ejection cycle of the certain nozzle 121.

After the detection process according to each of the above detection modes, the controller 20 controls the ejecting head 10 to execute the printing.

Figure 6A:
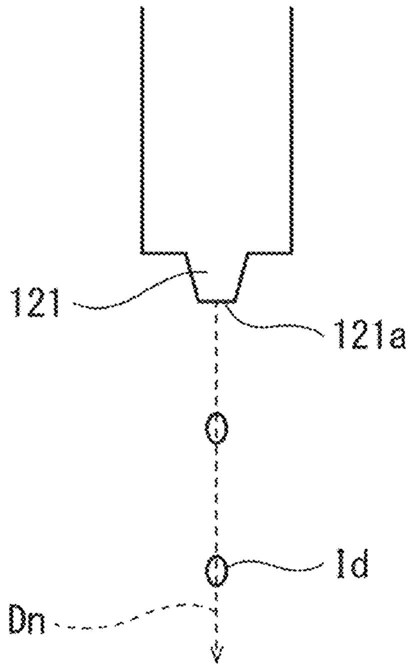
FIG. 6A depicts a case of a normal ejection in which ejection of the ink droplets by a nozzle is normal.
Figure 6B:
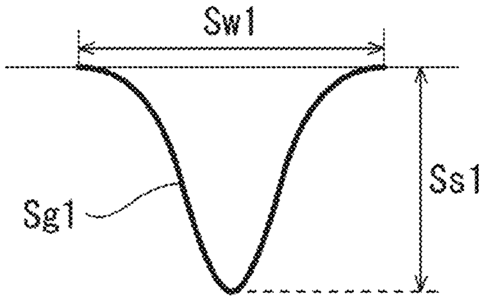
FIG. 6B depicts a reference signal which is a detection signal detected by a detecting element in the normal ejection.

The following is a detailed explanation of the phenomenon causing the ejection failure detected in the second detecting mode. FIG. 6A depicts a case of a normal ejection in which ejection of the ink droplets Id by a nozzle 121 is normal, and FIG. 6B depicts a reference signal Sg1, which is the detection signal detected by the detecting element 67 in the normal ejection.

As depicted in FIG. 6A, an ink droplet Id ejected from the nozzle 121, which has no ejection failure, flies along the normal flying direction Dn. At this time, the detection signal detected by the detecting element 67 in the first and second detecting modes is the reference signal Sg1. As depicted in FIG. 6B, the reference signal Sg1 has a signal strength Ss1 and a signal width Sw1. The controller 20 stores the reference signal Sg1 detected by the detecting element 67 in RAM 22. The above signal width means a time width of the signal. In the following description, the time width of each detection signal is simply referred to as the signal width.

Figure 7A:
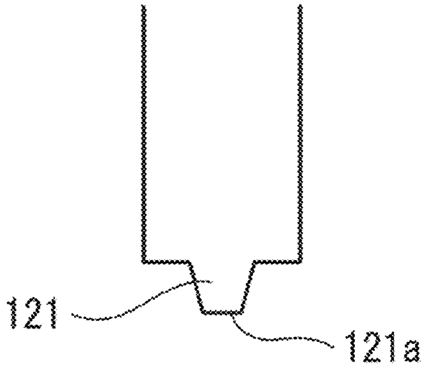
FIG. 7A depicts a case of a non-ejection of ink droplet being occurred.
Figure 7B:
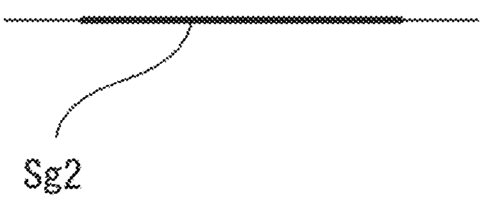
FIG. 7B depicts a detection signal detected by the detecting element when the non-ejection occurred.

FIG. 7A depicts a case of a non-ejection of ink droplet Id being occurred, and FIG. 7B depicts a detection signal Sg2 detected by the detecting element 67 when the non-ejection occurs. When no ink droplet Id is ejected from a nozzle 121 as depicted in FIG. 7A, no peak appears in the detection signal Sg2 detected by detecting element 67 in the first and second detecting modes, as depicted in FIG. 7B. If the controller 20 receives the detection signal Sg2 from the detecting element 67, the controller 20 determines that the non-ejection is occurring as the phenomenon causing the ejection failure. The controller 20 stores the detection signal Sg2 detected by the detecting element 67 in the RAM 22.

Figure 8A:
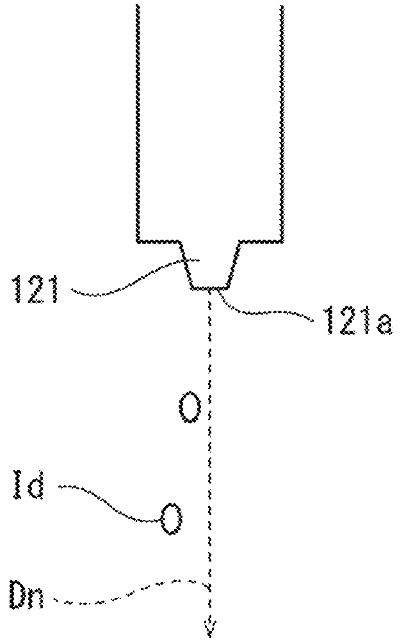
FIG. 8A depicts a case of a misdirection of ink droplet Id being occurred.
Figure 8B:
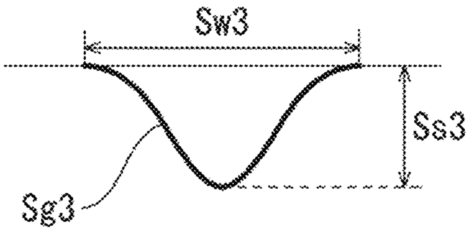
FIG. 8B depicts a detection signal detected by the detecting element when the misdirection occurred.

FIG. 8A depicts a case of a misdirection of ink droplet Id being occurred, and FIG. 8B depicts a detection signal Sg3 detected by the detecting element 67 when the misdirection occurs. As depicted in FIG. 8A, an ink droplet Id ejected from a nozzle 121 may fly in a direction different from the normal flying direction Dn. A phenomenon in which the ink droplet Id flies in a direction different from the normal flying direction Dn is called as the misdirection. When the misdirection occurs, the detection signal Sg3 detected by the detecting element 67 in the first to third detecting modes has the signal strength Ss3 and the signal width Sw3 as depicted in FIG. 8B.

A difference between the signal strength Ss3 of the detection signal Sg3 and the signal strength Ss1 of the reference signal Sg1 is greater than a threshold value related to the signal strength. A difference between the signal width Sw3 of the detection signal Sg3 and the signal width Sw1 of the reference signal Sg1 is also greater than a threshold value related to the signal width. If the control unit 20 receives the detection signal Sg3 from the detecting element 67, the controller 20 determines that the misdirection is occurring as the phenomenon causing the ejection failure. The controller 20 stores the detection signal Sg3 detected by the detecting element 67 in the RAM 22.

Figure 9A:
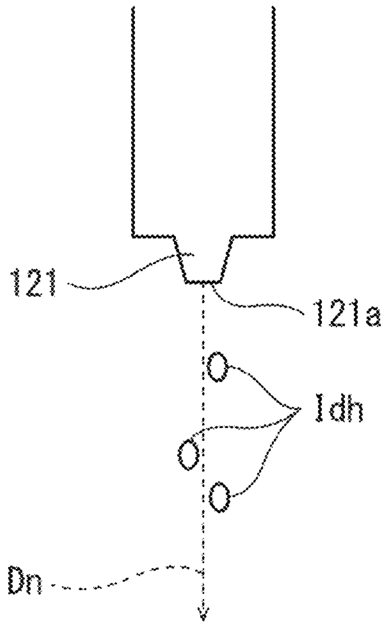
FIG. 9A depicts a case of a splash of an ink droplet Id being occurred.
Figure 9B:
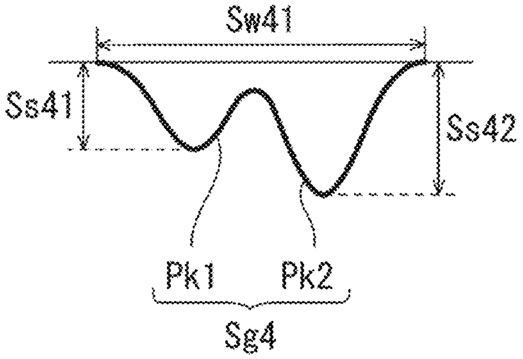
FIG. 9B depicts a detection signal detected by the detecting element when the splash occurred.

FIG. 9A depicts a case of a splash of an ink droplet Id being occurred, and FIG. 9B depicts a detection signal Sg4 detected by the detecting element 67 when the splash occurred. As depicted in FIG. 9A, one ink droplet Id ejected from a nozzle 121 may fly while breaking up into multiple splashes Idh. In this case, there are multiple peaks Pk1 and Pk2 in the detection signal Sg4 detected by the detecting element 67 in the second and third detecting modes, as depicted in FIG. 9B. Although two peaks Pk1, Pk2 are illustrated in FIG. 9B, the number of the peaks may be three or more.

The difference between the signal strength Ss41 of the peak Pk1 and the signal strength Ss1 of the reference signal Sg1 in the detection signal Sg4 is greater than the threshold value related to the signal strength. The difference between the signal strength Ss42 of the peak Pk2 in the detection signal Sg4 and the signal strength Ss1 of the reference signal Sg1 is larger than the threshold value related to the signal strength. Furthermore, the difference between the signal width Sw4 of the detection signal Sg4 and the signal width Sw1 of the reference signal Sg1 is larger than the threshold value related to the signal width. When the controller 20 receives the detection signal Sg4 from the detecting element 67, the controller 20 determines that the splash is occurring as a phenomenon that causes the ejection failure. The controller 20 stores the detection signal Sg4 detected by the detecting element 67 in the RAM 22.

Figure 10A:
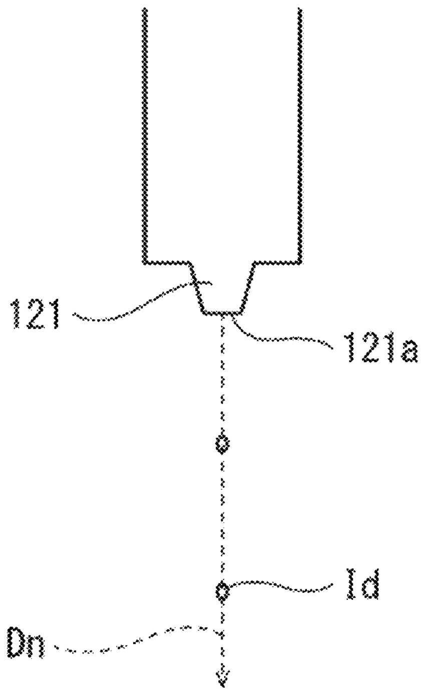
FIG. 10A depicts a case of a volume change of an ink droplet being occurred.
Figure 10B:
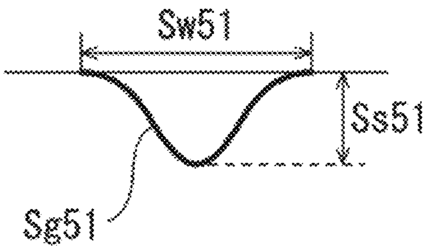
FIG. 10B depicts a detection signal detected by the detecting element when a volume of the ink droplet is decreased.
Figure 10C:
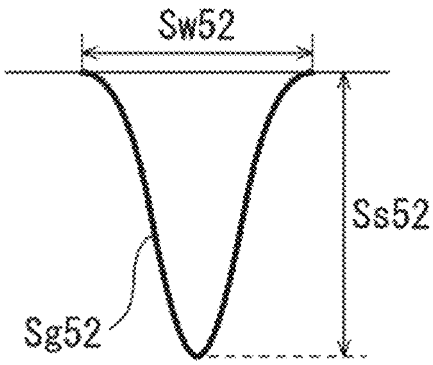
FIG. 10C depicts a detection signal detected by the detecting element when a volume of the ink droplet is increased.

FIG. 10A depicts a case of a volume change of an ink droplet Id being occurred, FIG. 10B depicts a detection signal Sg51 detected by the detecting element 67 when a volume of the ink droplet Id is decreased, and FIG. 10C depicts a detection signal Sg52 detected by the detecting element 67 when the volume of the ink droplet Id is increased.

As depicted in FIG. 10A, an ink droplet Id ejected from a nozzle 121 may fly with its volume being decreased (or increased) as compared with a normal volume. In this case, when the volume of the ink droplet Id is decreased, the detection signal Sg51 detected by the detecting element 67 in the second and third detecting modes has a signal strength Ss51 and a signal width Sw51 as depicted in FIG. 10B. When the volume of the ink droplet Id is increased, the detection signal Sg52 detected by the detecting element 67 in the second and third detecting modes has a signal strength Ss52 and a signal width Sw52 as depicted in FIG. 10C.

A difference between the signal strength Ss51 of the detection signal Sg51 and the signal strength Ss1 of the reference signal Sg1 is greater than the threshold value related to the signal strength, and a difference between the signal width Sw51 of the detection signal Sg51 and the signal width Sw1 of the reference signal Sg1 is less than the threshold value related to the signal width. A difference between the signal strength Ss52 of the detection signal Sg52 and the signal strength Ss1 of the reference signal Sg1 is greater than the threshold value related to the signal strength, and a difference between the signal width Sw52 of the detection signal Sg52 and the signal width Sw1 of the reference signal Sg1 is less than the threshold value related to the signal width. If the controller 20 receives the detection signal Sg51 from the detecting element 67, the controller 20 determines that the volume change is occurring in which the volume of the ink droplet Id is decreased as compared with the normal volume, as the phenomenon causing the ejection failure. On the other hand, if the controller 20 receives the detection signal Sg52 from the detecting element 67, the controller 20 determines that the volume change is occurring in which the volume of the ink droplet Id is increased as compared with the normal volume, as the phenomenon causing the ejection failure. The controller 20 stores the detection signals Sg51 and Sg52 detected by the detecting element 67 in the RAM 22.

Figure 11A:
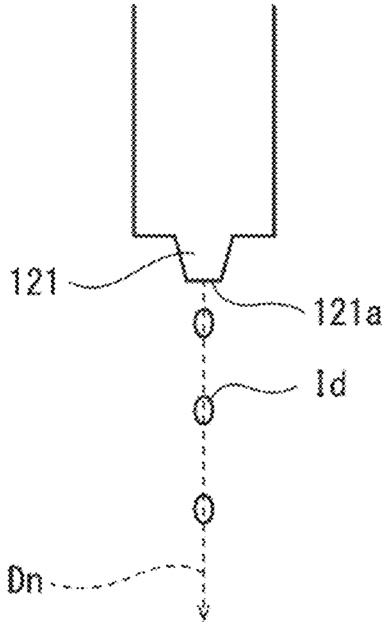
FIG. 11A depicts a case of a speed change of an ink droplet being occurred.
Figure 11B:
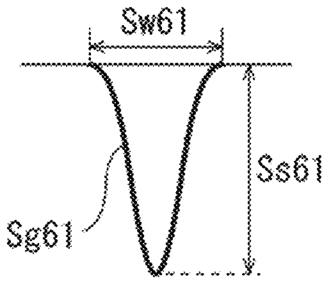
FIG. 11B depicts a detection signal detected by the detecting element when a speed of the ink droplet is increased.
Figure 11C:
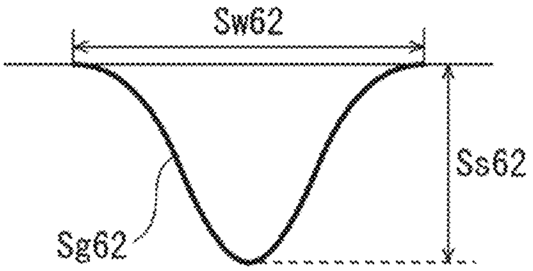
FIG. 11C depicts a detection signal detected by the detecting element when a speed of the ink droplet is decreased.

FIG. 11A depicts a case of a speed change of an ink droplet Id being occurred, FIG. 11B depicts a detection signal Sg61 detected by the detecting element 67 when a speed of the ink droplet Id is increased, and FIG. 11C depicts a detection signal Sg62 detected by the detecting element 67 when a speed of the ink droplet Id is decreased.

As depicted in FIG. 11A, an ink droplet Id ejected from a nozzle 121 may fly with its flying speed being decreased (or increased) as compared with a normal speed. In this case, if the flying speed of the ink droplet Id is increased, the detection signal Sg61 detected by the detecting element 67 in the second and third detecting modes has a signal strength Ss61 and a signal width Sw61, as depicted in FIG. 11B. If the flying speed of the ink droplet Id is decreased, the detection signal Sg62 detected by the detecting element 67 in the second and third detection modes has a signal strength Ss62 and a signal width Sw62 as depicted in FIG. 11C.

A difference between the signal strength Ss61 of the detection signal Sg61 and the signal strength Ss1 of the reference signal Sg1 is smaller than the threshold value related to the signal strength, and a difference between the signal width Sw61 of the detection signal Sg61 and the signal width Sw1 of the reference signal Sg1 is larger than the threshold value related to the signal width. A difference between the signal strength Ss62 of the detection signal Sg62 and the signal strength Ss1 of the reference signal Sg1 is smaller than the threshold value related to the signal strength, and a difference between the signal width Sw62 of the detection signal Sg62 and the signal width Sw1 of the reference signal Sg1 is larger than the threshold value related to the signal width. If the controller 20 receives the detection signal Sg61 from the detecting element 67, the controller 20 determines that the speed change is occurred in which the flying speed of the ink droplet Id is increased as compared with the normal speed, as the phenomenon causing the ejection failure. On the other hand, if the controller 20 receives the detection signal Sg62 from the detecting element 67, the controller 20 determines that the speed change is occurred in which the flying speed of the ink droplet Id is decreased as compared with the normal speed, as the phenomenon causing the ejection failure. The controller 20 stores the detection signals Sg61 and Sg62 detected by the detecting element 67 in the RAM 22.

As described above, the laser light Lz with the first output power is radiated in the first detecting mode, the laser light Lz with the second output power is radiated in the second detecting mode, and laser light Lz with the third output power is radiated in the third detecting mode. However, the output power of the laser light Lz may be changed within each detecting mode as follows.

In FIG. 5, an energy density of the laser light Lz becomes lower as the laser light Lz moves away from a focus position $Z_f$ to one side and to the other side along the optical axis of the laser light Lz. In FIG. 5, the energy density is the lowest at a flying position $Z_{fa}$ of an ink droplet Id, which is at a distance of $Z_{ga}$ from the focus position $Z_f$ in the optical axis direction of the laser light Lz and is the furthest from the focus position $Z_f$. Similarly, the energy density is the lowest at a flying position $Z_{fb}$ of an ink droplet Id, which is at a distance of $Z_{gb}$ from the focus position $Z_f$ in the optical axis direction of the laser light Lz and is the furthest from the focus position $Z_f$. The focus position of the laser light Lz is a position where a beam diameter of the laser light Lz is the smallest.

Therefore, the controller 20 changes the output power of the light source 65 according to the distance between the focus position $Z_f$ of the laser light Lz radiated from the light source 65 and the flying position of the ink droplet Id (ink droplet Id for which the ejection failure is to be detected) ejected from the nozzle 121. If the distance between the focus position $Z_f$ and the flying position is a second distance greater than a first distance, the controller 20 increases the output power of the light source 65 as compared with a case of the distance being the first distance. In other words, the controller 20 increases the output power of the light source 65 as the distance between the focus position $Z_f$ and the flying position increases.

Figure 12:
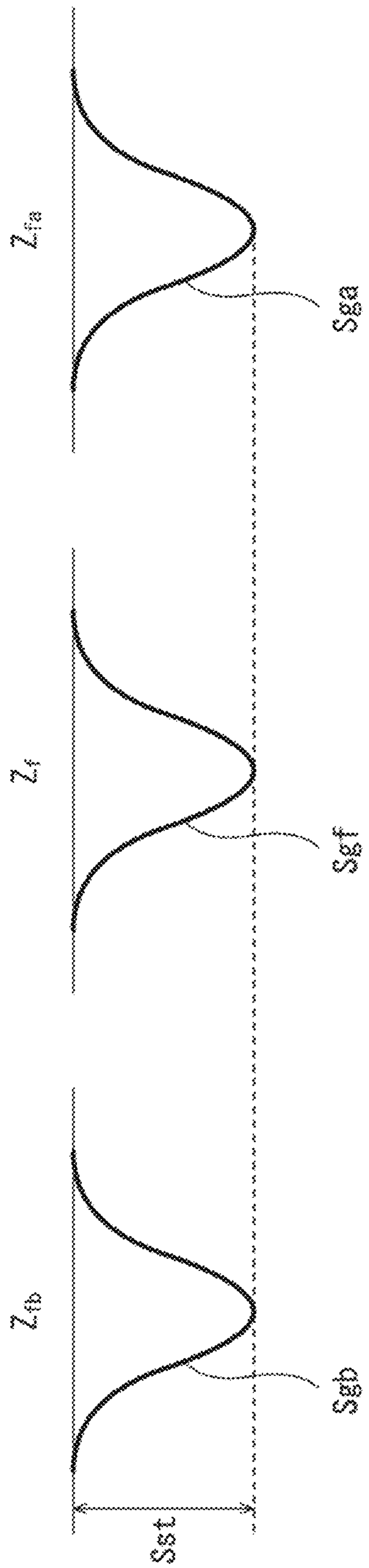
FIG. 12 depicts a detection signal related to ink droplets at a focus position of the laser light and detection signals related to ink droplets at flying positions away from the focus position.

In FIG. 5, the controller 20 controls the output power of the light source 65 so that the energy density of the laser light Lz at the flying position $Z_{fa}$ and the flying position $Z_{fb}$, where detection is most unfavorable due to the lowest energy density of the laser light Lz, is almost the same as that at the focus position $Z_f$. In this case, the controller 20 controls the output power of the light source 65 so that the signal strength of the detection signal $S_{ga}$ related to the laser light Lz that passed through the ink droplet Id at the flying position $Z_{fa}$ is the same as the signal strength $S_{st}$ of the detection signal $S_{gf}$ related to the laser light Lz that passed through the ink droplet Id at the focus position $Z_f$ as depicted in FIG. 12. Similarly, the controller 20 controls the output power of the light source 65 so that the signal strength of the detection signal $S_{gb}$ related to the laser light Lz that passed through the ink droplet Id at the flying position $Z_{fb}$ is the same as the signal strength $S_{st}$ of the detection signal $S_{gf}$.

Since the laser light Lz is a beam having a strength distribution in a plane orthogonal to the optical axis direction approximate to a Gaussian distribution, the laser light radius at an arbitrary position away from the focus position can be obtained by using the following Formula 1. In Formula 1, ω(z) is the laser light radius at an arbitrary coordinate z in the optical axis direction, $\omega_0$ is the laser light radius at the focus position $Z_f$ stored in the ROM 21 in advance, λ is the wavelength of the laser light Lz stored in the ROM 21 in advance, z is an arbitrary coordinate in the optical axis direction of the laser light Lz, and $M^2$ is a factor representing quality of the laser light Lz.

$$\omega(z) = \omega_0 \sqrt{1 + \left(\frac{\lambda z M^2}{\pi \omega_0^2}\right)^2} \quad \langle\text{Formula 1}\rangle$$

From Formula 1, the laser light radius at the distance z from the focus position $Z_f$ is x times the laser light radius at the focus position $Z_f$. The x is expressed by Formula 2 below.

$$x = \sqrt{1 + \left(\frac{\lambda z M^2}{\pi \omega_0^2}\right)^2} \quad \langle\text{Formula 2}\rangle$$

The laser light area at the distance z away from the focus position $Z_f$ is y times the laser light area at the focus position $Z_f$. The y is expressed by the following Formula 3.

$$y = 1 + \left(\frac{\lambda z M^2}{\pi \omega_0^2}\right)^2 \quad \langle\text{Formula 3}\rangle$$

The energy density of the laser light Lz at the distance z away from the focus position $Z_f$ is the reciprocal multiple of the above Formula 3. Therefore, when the controller 20 calculates the output power of the laser light Lz for irradiating the ink droplet Id flying at the distance z away from the focus position $Z_f$, the controller 20 multiplies the output power of the laser light Lz irradiating the ink droplet Id flying at the focus position $Z_f$ by the above y. In this way, the controller 20 calculates the output value of the laser light Lz that irradiates the ink droplet Id flying at the distance z away from the focus position $Z_f$, and controls the output power of the light source 65. This allows the signal strength of the detection signal relating to the ink droplet Id flying at the distance z away from the focus position $Z_f$ to be the same as the signal strength of the detection signal relating to the ink droplet Id flying at the focus position $Z_f$. This makes it possible to ensure the signal strength necessary to perform the detection with high accuracy, even at positions where the detection is disadvantageous.

Figure 13:
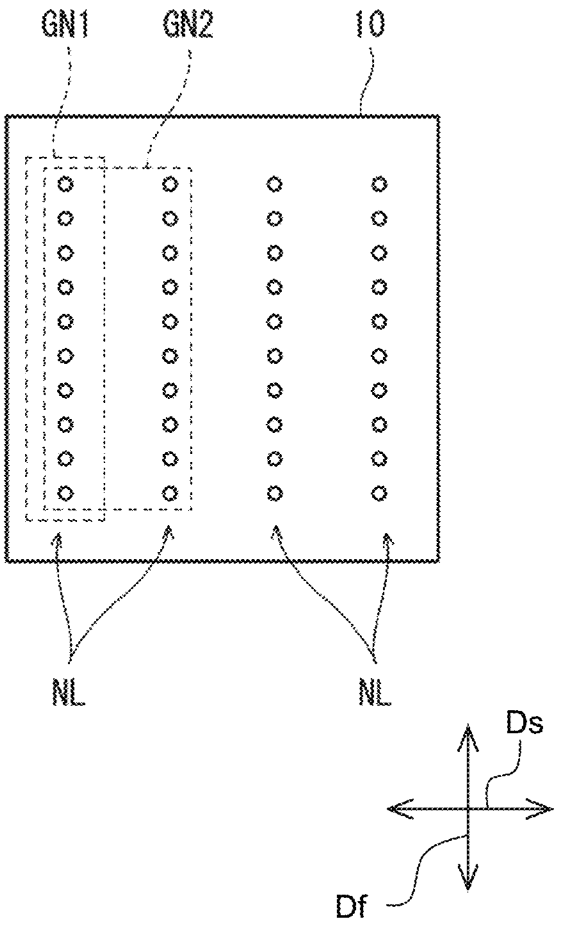
FIG. 13 illustrates processing targets of the detecting process in each detecting mode.

FIG. 13 illustrates processing targets of the detecting process in each detecting mode. As depicted in FIG. 13, the ejecting head 10 of this embodiment has a plurality of nozzle rows NL in which a plurality of nozzles 121 are arranged. Each of the nozzle rows NL extends in the same direction as the conveyance direction Df, and the nozzle rows are provided at predetermined intervals from each other in the same direction as the moving direction Ds.

In executing detection once in the first or second detecting mode, the controller 20 makes a nozzle row group, that is a part of the plurality of nozzle rows NL and is different from a target nozzle row group detected last time, a detection target. For example, the controller 20 can make the ink droplets Id ejected from each nozzle 121 in a nozzle row group GN1, which consists of one nozzle row NL among the plurality of nozzle rows NL, the detection target. In this case, the controller 20 can alternately perform the detection for an odd-numbered nozzle row NL and the detection for an even-numbered nozzle row NL. Alternatively, the controller 20 may perform the detection for each nozzle row group GN2, which consists of two nozzle rows NL.

Figure 14:
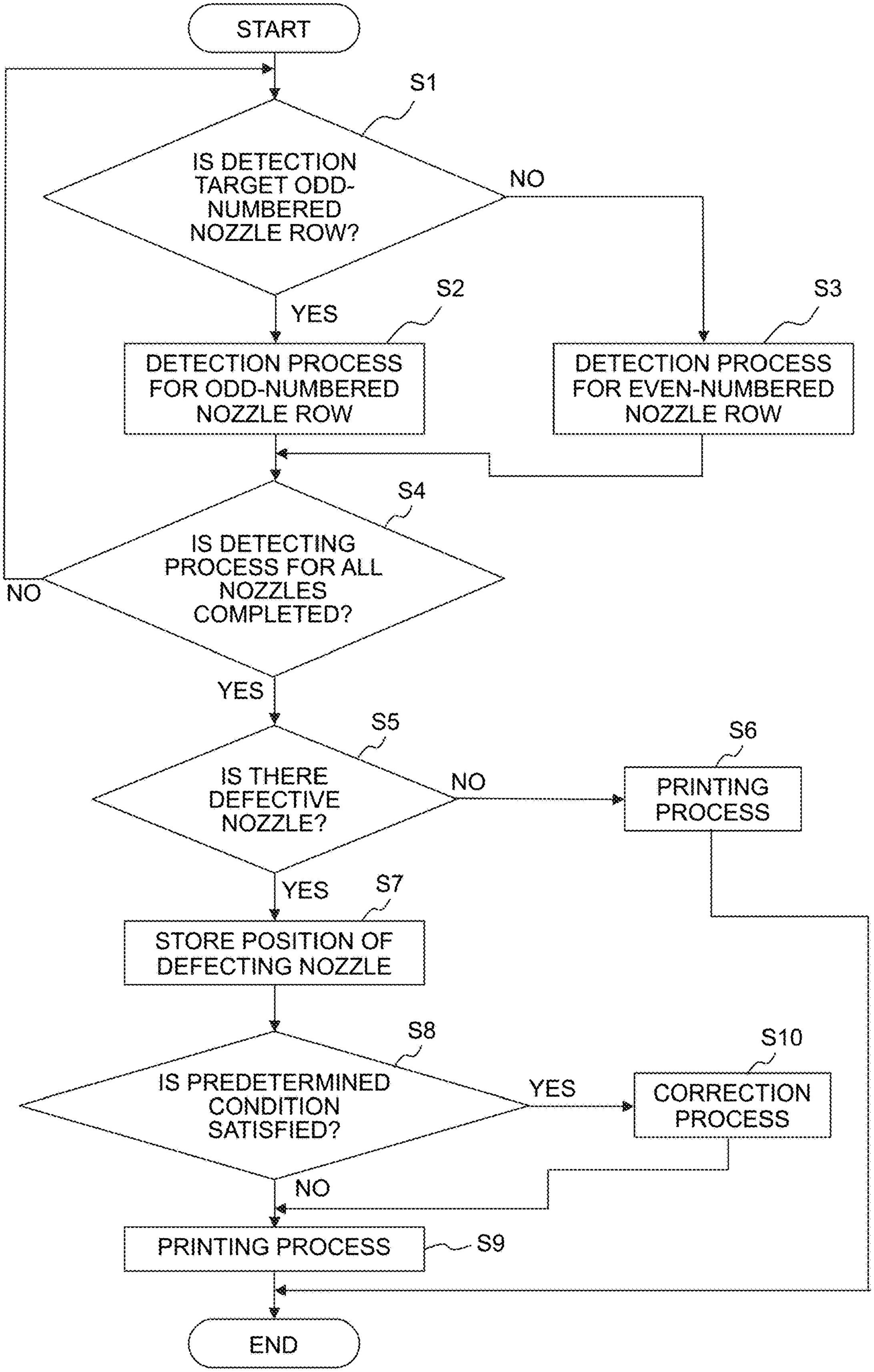
FIG. 14 is a flowchart depicting a process flow by a controller.

FIG. 14 is a flowchart depicting a process flow by the controller 20. As depicted in FIG. 14, the controller 20 determines whether the detection target is an odd-numbered nozzle row NL (step S1). If the detection target is the odd-numbered nozzle row NL (YES in step S1), the controller 20 executes the ejection failure detection process for the odd-numbered nozzle row NL (step S2). On the other hand, if the detection target is not the odd-numbered nozzle row NL (NO in step S1), the controller 20 executes the ejection failure detection process for an even-numbered nozzle row NL (step S3).

Next, the controller 20 determines whether the ejection failure detection process has been completed for all nozzle rows (step S4). If the ejection failure detection process has not been completed for all nozzle rows (NO in step S4), the controller 20 returns to step S1 and repeats the processes described above.

When the ejection failure detecting process has been completed for all nozzle rows (YES in step S4), the controller 20 determines whether there is a defective nozzle with the ejection failure (step S5). If there are no defective nozzles (NO in step S5), the controller 20 causes the ejecting head 10 to execute the printing (step S6).

If there is a defective nozzle (YES in step S5), the controller 20 stores a position of the defective nozzle in the RAM 22 (step S7). Next, the controller 20 determines whether or not a predetermined condition is satisfied (step S8). The predetermined condition is, for example, a condition in which two or more defective nozzles are placed in succession, or a condition in which the ratio of the number of the defective nozzles to the total number of nozzles is, for example, 1% or more.

If the predetermined condition is not satisfied (NO in step S8), the controller 20 causes the ejecting head 10 to execute the printing (step S9). On the other hand, if the predetermined condition is satisfied (YES in step S8), the controller 20 executes a predetermined correction process (step S10) and then causes the ejecting apparatus 10 to execute the printing (step S9). The above correction process is, for example, to change the size of the ink droplet Id ejected from the defective nozzle, to change the ejection cycle of the defective nozzle, and so on.

As described above, according to the liquid droplet ejecting apparatus 1*a*, the first detection mode in which the ink droplet Id is irradiated with the laser light Lz at the first output power, and the second detection mode in which the ink droplet Id is irradiated with the laser light Lz at the second output power higher than the first output power, can be used separately. Therefore, it is possible to avoid such a situation in which the laser light Lz is radiated with a high output power such as the second output power even when detecting the ejection failure of nozzles. As a result, deterioration of the light source 65 can be suppressed more than in the conventional technique, leading to an extension of life of the light source 65.

In this embodiment, the controller 20 executes the detection in the first detection mode when the ejecting head 20 is required to perform the standard quality printing, and the controller 20 executes the detection in the second detection mode when the ejecting head 10 is required to perform the high quality printing. In this case, only when the high quality printing is required, the detection can be executed with high accuracy required to detect the phenomenon that causes the ejection failure.

In this embodiment, if the controller 20 detects the ejection failure of a certain nozzle 121 in the first detection mode, the controller 20 executes the detection in the second detection mode for the certain nozzle 121 having the ejection failure. In this case, detection in the second detection mode can be executed only when the ejection failure is detected. In other words, if no ejection failure is detected, the detection in the second detection mode is not necessary. This leads to suppression of deterioration of the light source 65.

In this embodiment, the controller 20 executes the detection in a detection mode selected by the user, after the user has selected any of the first to three detection modes and before printing. In this case, the user can select a more accurate detecting mode based on his/her own will when it is recognized that a more accurate detection should be performed, such as when the image forming apparatus 1 has not been used for a long period of time.

In this embodiment, the second output power in the second detecting mode is not less than twice the first output power in the first detecting mode. This enables highly accurate detection of the phenomenon causing the ejection failure.

In this embodiment, the controller 20 determines that the misdirection has occurred, if the difference between the signal strength Ss3 of the detection signal Sg3 detected by the detecting element 67 in the first and second detecting modes and the signal strength Ss1 of the reference signal Sg1 is larger than the threshold value related to the signal strength, and if the difference between the signal width Sw3 of the detection signal Sg3 and the signal width Sw1 of the reference signal Sg1 is larger than the threshold value related to the signal width. This enables highly accurate determination of whether or not the misdirection is occurring.

In this embodiment, the controller 20 determines that the splash is occurring, if the differences between the signal strength Ss41, Ss42 of the detection signal Sg4 detected by the detecting element 67 in the second detecting mode and the signal strength Ss1 of the reference signal Sg1 are larger than the threshold value related to the signal strength respectively, if the differences between the signal width Sw41, Sw42 of the detection signal Sg4 and the signal width of the reference signal Sg1 Sw1 are larger than the threshold value related to the signal width, respectively, and if the multiple peaks Pk1 and Pk2 exist in the waveform of the detection signal Sg4. This allows highly accurate determination of whether or not the splash is occurring.

In this embodiment, the controller 20 determines that the volume change of the ink droplet Id has occurred, if the difference between the signal strength Ss51 of the detection signal Sg51 or the signal strength Ss52 of the detection signal Sg52 and the signal strength Ss1 of the reference signal Sg1 is larger than the threshold value related to the signal strength, and if the difference between the signal width Sw51 of the detection signal Sg51 or the signal width Sw52 of the detection signal Sg52 and the signal width Sw1 of the reference signal Sg1 is smaller than the threshold value relating to the signal width. This enables highly accurate determination as to whether or not the volume change of the ink droplet Id is occurring.

In this embodiment, the controller 20 determines that the speed change of the ink droplet Id has occurred, if the difference between the signal strength Ss61 of the detection signal Sg61 or the signal strength Ss62 of the detection signal Sg62 and the signal strength Ss1 of the reference signal Sg1 is smaller than the threshold value related to the signal strength, and if the difference between the signal width Sw61 of the detection signal Sg61 or the signal width Sw62 of the detection signal Sg62 and the signal width Sw1 of the reference signal Sg1 is larger than the threshold value related to the signal width. This enables highly accurate determination as to whether or not the speed change of the ink droplet Id is occurring.

In this embodiment, the controller 20 determines that the non-ejection of the ink droplet Id is occurring if no detection signal is detected by the detecting element 67. This allows the controller 20 to determine whether the non-ejection of the ink droplet Id has occurred or not.

In this embodiment, the controller 20 detects in the third detection mode the magnitude of the phenomenon causing the ejection failure detected in the second detection mode. In this case, the magnitude (degree) of each phenomenon can be obtained, and an appropriate correction process can be performed according to the magnitude.

In this embodiment, the third output in the third detecting mode is not less than three times the first output power in the first detecting mode. In this case, the magnitude of each phenomenon causing the ejection failure can be obtained with high accuracy.

In this embodiment, the controller 20 determines the correction values for ejecting the ink droplets Id from the nozzle 121 having the ejection failure, based on the magnitude of the phenomenon detected in the third detecting mode. In this case, the correction value for correcting the volume and the ejection waveform, etc. of the ink droplet Id to be ejected by the nozzle 121 having the ejection failure can be determined with high accuracy.

In this embodiment, the controller 20 changes the output power of the light source 65 in accordance with the distance between the focus position $Z_f$ of the laser light Lz radiated from the light source 65 and the flying position of the ink droplet Id ejected from a target nozzle 121 that is to be detected. In this case, emitting the laser light Lz from the light source 65 with the minimum necessary output power that can be detected by detecting element 67 can contribute to extending the life of the light source 65, and detection can be performed without lowering the detection accuracy.

The greater the distance between the light collection position $Z_f$ and the flying position, the smaller the received amount of the laser light Lz detected by the detecting element 67. In this embodiment, the controller 20 increases the output power of the light source 65 as the distance increases. This avoids a decrease in the detection accuracy by the detecting element 67.

Furthermore, in this embodiment, the controller 20, in one detection in the first or second detecting mode, makes the nozzle row groups GN1, GN2, which is a part of the plurality of nozzle rows NL and which is a different from the nozzle row group detected last time, the detection target. In this case, for example, by targeting only odd or even numbered nozzle row in one detection, the detection time can be shortened and the number of output of the laser light Lz can be reduced.

Modified Examples

The present teaching is not limited to the embodiment described above, and various modifications are possible without departing from the gist of the invention.

In the above embodiment, a predetermined correction process is performed when a nozzle 121 with ejection failure is detected. However, a purging process or a flushing process may be performed instead of or in conjunction with the correction process.

The user should first select the first detecting mode, which has the lowest output power of the light source 65, to minimize degradation of the light source 65, but it is possible to omit the first detecting mode and select the second detecting mode or the third detecting mode.

In the above embodiment, three detecting modes are provided as the detection modes. However, the detecting modes include only the first and second detection modes, or four or more detection modes may be provided.

Furthermore, in the above embodiment, the output power of the light source 65 in the second detecting mode is not less than twice the output power in the first detecting mode, and the output power of the light source 65 in the third detecting mode is not less than three times the output power in the first detecting mode, but the above multiples are examples and not limited to the above multiples.

What is claimed is:

1. A liquid droplet ejecting apparatus, comprising:

an ejecting head having a plurality of nozzles through which liquid droplets are ejected onto a print medium;

a light source configured to cause light to be radiated toward a flight space with a first output power or a second output power higher than the first output power, the flight space being a space in which the liquid droplets ejected from the ejecting head fly;

a detecting element configured to detect received amount of the light radiated from the light source and passed through the liquid droplets flying in the flight space; and a controller configured to:

cause the light to be radiated from the light source with the first output power or the second output power at a timing of the ejecting head being driven such that the ejecting head ejects the liquid droplets;

in a first detecting mode in which the light is radiated from the light source with the first output power, execute a detection about an ejection failure of one of the nozzles based on the received amount of the light detected by the detecting element; and in a second detecting mode in which the light is radiated from the light source with the second output power, execute a detection about a phenomenon causing the ejection failure based on the received amount of the light detected by the detecting element.

2. The liquid droplet ejecting apparatus according to claim 1, wherein in a case of executing a printing with a first image quality by the ejecting head, the controller is configured to execute the detection in the first detecting mode, and in a case of executing a printing with a second image quality higher than the first image quality, the controller is configured to execute the detection in the second detecting mode.

3. The liquid droplet ejecting apparatus according to claim 1, wherein in a case that the ejection failure of the one of the nozzles is detected in the first detecting mode, the controller is configured to detect the phenomenon with respect to the one of the nozzles in the second detecting mode.

4. The liquid droplet ejecting apparatus according to claim 1, wherein after one of the first detecting mode and the second detecting mode is selected by a user and before executing a printing, the controller is configured to execute the detection in the first detecting mode or the detection in the second detecting mode in accordance with a selection by the user.

5. The liquid droplet ejecting apparatus according to claim 1, wherein the second output power in the second detecting mode is not less than twice the first output power in the first detecting mode.

6. The liquid droplet ejecting apparatus according to claim 1, wherein a signal detected by the detecting element in a case of executing the detection in the second detecting mode with respect to a nozzle without the ejection failure is defined as a reference signal, and in the second detecting mode, if a difference between a signal strength of a detection signal detected by the detecting element and a signal strength of the reference signal is greater than a threshold value related to a signal strength, and if a difference between a signal width of the detection signal and a signal width of the reference signal is greater than a threshold value related to a signal width, the controller is configured to determine that a misdirection, in which a flying direction of the liquid droplets ejected from the one of the nozzles is different from a normal flying direction, is occurred to the one of the nozzles.

7. The liquid droplet ejecting apparatus according to claim 1, wherein a signal detected by the detecting element in a case of executing the detection in the second detecting mode with respect to a nozzle without the ejection failure is defined as a reference signal, and in the second detecting mode, if a difference between a signal strength of a detection signal detected by the detecting element and a signal strength of the reference signal is greater than a threshold value related to a signal strength, if a difference between a signal width of the detection signal and a signal width of the reference signal is greater than a threshold value related to a signal width, and if a wave form of the detection signal has a plurality of peaks, the controller is configured to determine that a splash, in which one liquid droplet ejected from the one of the nozzles is broken up into a plurality of droplets, is occurred to the one of the nozzles.

8. The liquid droplet ejecting apparatus according to claim 1, wherein a signal detected by the detecting element in a case of executing the detection in the second detecting mode with respect to a nozzle without the ejection failure is defined as a reference signal, and in the second detecting mode, if a difference between a signal strength of a detection signal detected by the detecting element and a signal strength of the reference signal is greater than a threshold value related to a signal strength, and if a difference between a signal width of the detection signal and a signal width of the reference signal is smaller than a threshold value related to a signal width, the controller is configured to determine that a volume change, in which a volume of one liquid droplet ejected from the one of the nozzles is smaller or greater than a normal volume, is occurred to the one of the nozzles.

9. The liquid droplet ejecting apparatus according to claim 1, wherein a signal detected by the detecting element in a case of executing the detection in the second detecting mode with respect to a nozzle without the ejection failure is defined as a reference signal, and in the second detecting mode, if a difference between a signal strength of a detection signal detected by the detecting element and a signal strength of the reference signal is smaller than a threshold value related to a signal strength, and if a difference between a signal width of the detection signal and a signal width of the reference signal is greater than a threshold value related to a signal width, the controller is configured to determine that a speed change, in which a flying speed of one liquid droplet ejected from the one of the nozzles is higher or lower than a normal speed, is occurred to the one of the nozzles.

10. The liquid droplet ejecting apparatus according to claim 1, wherein in a case of detecting no detection signal by the detecting element, the controller is configured to determine that a non-ejection, in which no liquid droplet is ejected from the one of the nozzles, is occurred to the one of the nozzles.

11. The liquid droplet ejecting apparatus according to claim 1, wherein in a third detecting mode in which the light is radiated from the light source with a third output power higher than the second output power, the controller is configured to detect magnitude of the phenomenon causing the ejection failure.

12. The liquid droplet ejecting apparatus according to claim 11, wherein the third output power in the third detecting mode is not less than three times the first output power in the first detecting mode.

13. The liquid droplet ejecting apparatus according to claim 11, wherein the controller is configured to determine a correction value related to an ejection of the liquid droplets from the one of the nozzles based on the magnitude of the phenomenon detected in the third detecting mode.

14. The liquid droplet ejecting apparatus according to claim 1, wherein the controller is configured to change an output power of the light source in accordance with a distance between a light focusing position of the light radiated from the light source and a flight position of the liquid droplets ejected from a target nozzle included in the nozzles.

15. The liquid droplet ejecting apparatus according to claim 14, wherein the distance between the light focusing position and the flight position includes a first distance and a second distance greater than the first distance, and in a case of the distance being the second distance, the controller is configured to increase the output power of the light source as compared with the case of the distance being the first distance.

16. The liquid droplet ejecting apparatus according to claim 1, where the nozzles form a plurality of nozzle rows, and in the first detection mode or in the second detection mode, when executing the detection once, the controller is configured to determine a nozzle row group, which includes a part of the nozzle rows and which is different from another nozzle row group detected last time, as a detection target.

* * * * *